United States Patent
Lofaro et al.

(10) Patent No.: US 11,471,378 B2
(45) Date of Patent: Oct. 18, 2022

(54) CUSTOM-MADE ARTIFICIAL NIPPLE

(71) Applicant: DENSLOJAC, LLC, Jackson, WY (US)

(72) Inventors: Maura J. Lofaro, Jackson, WY (US); Shannon Roberts, Jackson, WY (US)

(73) Assignee: DENSLOJAC, LLC, Jackson, WY (US)

( * ) Notice: Subject to any disclaimer, the term of this patent is extended or adjusted under 35 U.S.C. 154(b) by 289 days.

(21) Appl. No.: 16/821,031

(22) Filed: Mar. 17, 2020

(65) Prior Publication Data

US 2020/0214940 A1 Jul. 9, 2020

Related U.S. Application Data

(62) Division of application No. 15/482,417, filed on Apr. 7, 2017, now Pat. No. 10,603,247.

(Continued)

(51) Int. Cl.
| | |
|---|---|
| *A61J 11/00* | (2006.01) |
| *B29C 33/38* | (2006.01) |
| *A61J 17/00* | (2006.01) |
| *B33Y 50/02* | (2015.01) |
| *B33Y 70/00* | (2020.01) |

(Continued)

(52) U.S. Cl.
CPC ............ *A61J 11/005* (2013.01); *A61J 17/001* (2015.05); *B29C 33/3842* (2013.01); *B29C 33/3857* (2013.01); *B29C 33/3878* (2013.01); *B29C 39/003* (2013.01); *B29C 39/02* (2013.01); *B33Y 50/02* (2014.12); *B33Y 70/00* (2014.12); *B33Y 80/00* (2014.12); *B29C 2033/3871* (2013.01); *B29K 2007/00* (2013.01); *B29K 2021/003* (2013.01); *B29K 2083/00* (2013.01); *B29L 2031/7158* (2013.01);

(Continued)

(58) Field of Classification Search
CPC .... A61J 11/00; A61J 11/0035; A61J 11/0045; A61J 11/005; A61J 17/001; B29C 2033/3871; B29C 2033/3857; G06T 15/205; B29L 2031/7412

See application file for complete search history.

(56) References Cited

U.S. PATENT DOCUMENTS

| | | |
|---|---|---|
| 5,108,686 A | 4/1992 | Griffin |
| 6,161,710 A | 12/2000 | Dieringer |

(Continued)

FOREIGN PATENT DOCUMENTS

| | | |
|---|---|---|
| WO | 2016154681 | 10/2016 |
| WO | 2017019401 | 2/2017 |

OTHER PUBLICATIONS

"Breast Problems After breastfeeding," WebMD reference, Https://www.webmd.com/parenting/baby/after-nursing#1, Sep. 8, 2017.

(Continued)

*Primary Examiner* — Todd J Scherbel
(74) *Attorney, Agent, or Firm* — Fennemore Craig, P.C.

(57) ABSTRACT

An artificial nipple is formed of an elastomeric polymer by use of 3D printing after imaging of a mother's breast in an active state of lactation. The artificial nipple used as an attachment to a baby bottle or as the nipple component of a pacifier. Use of an artificial nipple formed in this manner mitigates a problem with nipple confusion, as may otherwise manifest in newborn offspring.

14 Claims, 10 Drawing Sheets

Related U.S. Application Data

(60) Provisional application No. 62/330,634, filed on May 2, 2016, provisional application No. 62/330,367, filed on May 2, 2016.

(51) Int. Cl.

| | | |
|---|---|---|
| *B33Y 80/00* | (2015.01) | |
| *B29C 39/00* | (2006.01) | |
| *B29C 39/02* | (2006.01) | |
| B29K 21/00 | (2006.01) | |
| B29K 7/00 | (2006.01) | |
| B29K 83/00 | (2006.01) | |
| B29L 31/00 | (2006.01) | |
| *G06T 15/20* | (2011.01) | |

(52) U.S. Cl.
CPC ..... *B29L 2031/7412* (2013.01); *G06T 15/205* (2013.01); *G06T 2215/16* (2013.01)

(56) References Cited

U.S. PATENT DOCUMENTS

| | | |
|---|---|---|
| 9,044,379 B2 | 6/2015 | Sabree |
| 9,044,380 B2 | 6/2015 | Sabree |
| 10,603,247 B2 * | 3/2020 | Lofaro ................. A61J 17/001 |
| 2006/0201901 A1 | 9/2006 | Sabree |
| 2007/0138709 A1 | 6/2007 | Sabree |
| 2017/0312184 A1 | 11/2017 | Lofaro et al. |
| 2017/0312185 A1 | 11/2017 | Lofaro et al. |
| 2017/0312186 A1 | 11/2017 | Lofaro et al. |
| 2018/0104156 A1 | 4/2018 | Mobbs |

OTHER PUBLICATIONS

"Lactation," Wikipedia https://en.wikipedia.org/wiki/Lactation (Year: 2019).

Geddes, Donna, "Inside the Lactating Breast: The Latest Anatomy Research," Nov./Dec. 2007, Journal of Midwifery & Women's Health, vol. 62, No. 6, pp. 556-563.

Smith, Ann, "Breast Milk Leakage," https://www.breastfeedingbasics.com/articles/breast-milk-leakage, Nov. 2018 (Year: 2018), 8 pages.

* cited by examiner

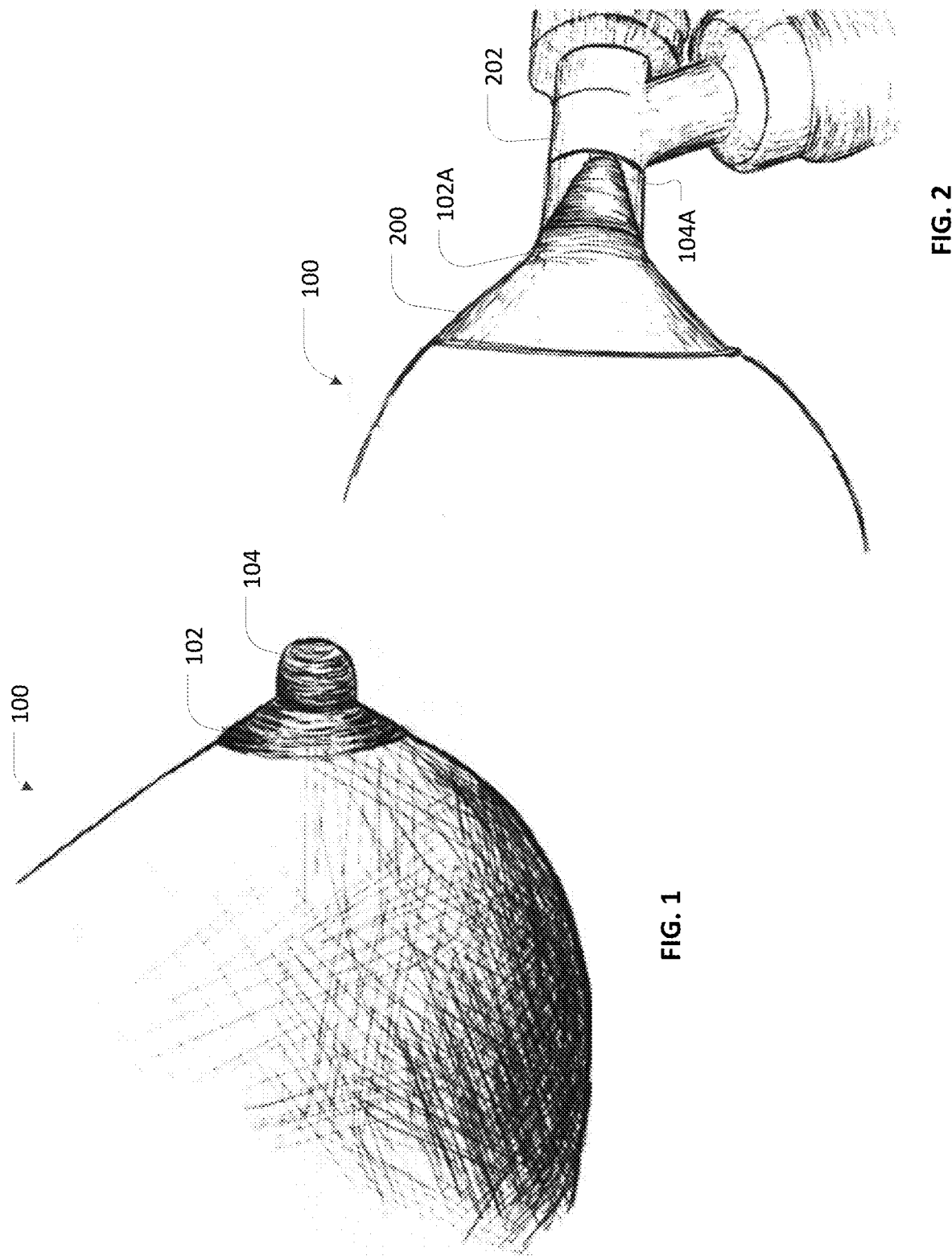

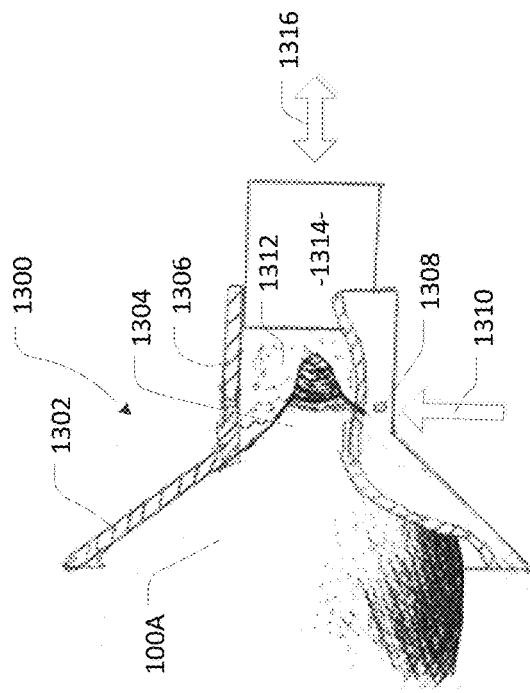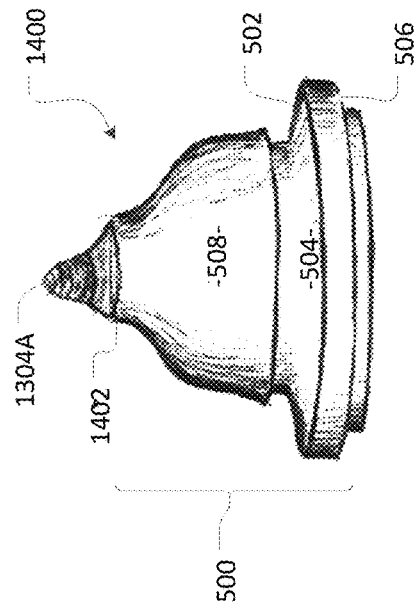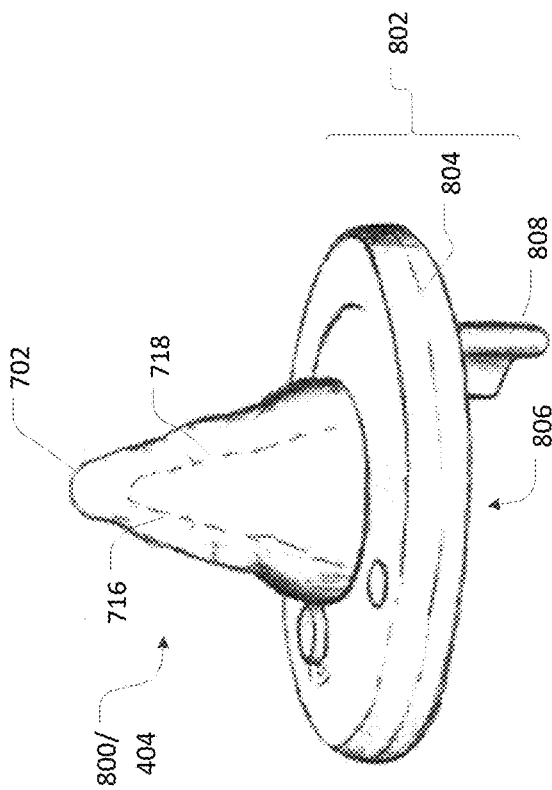

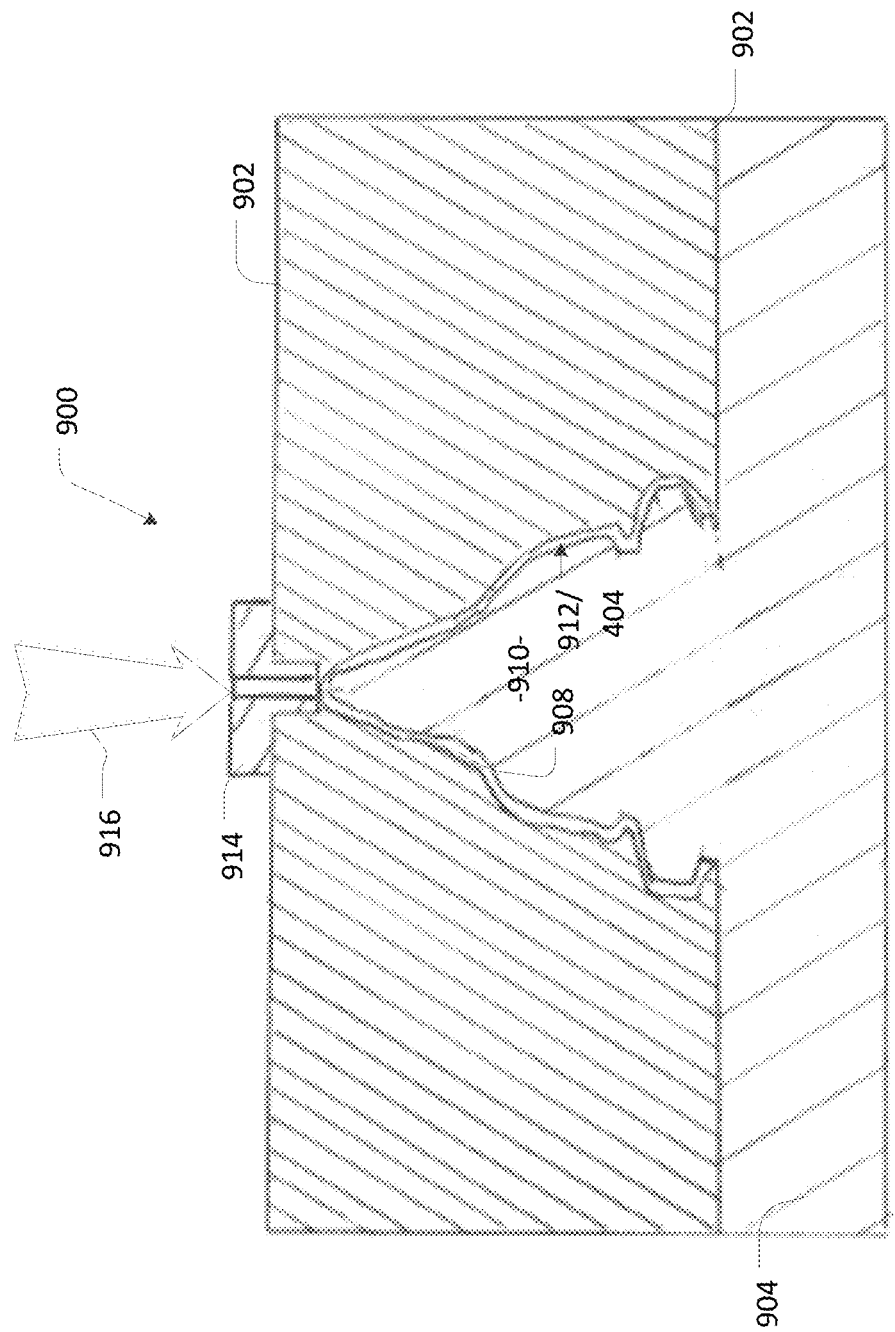

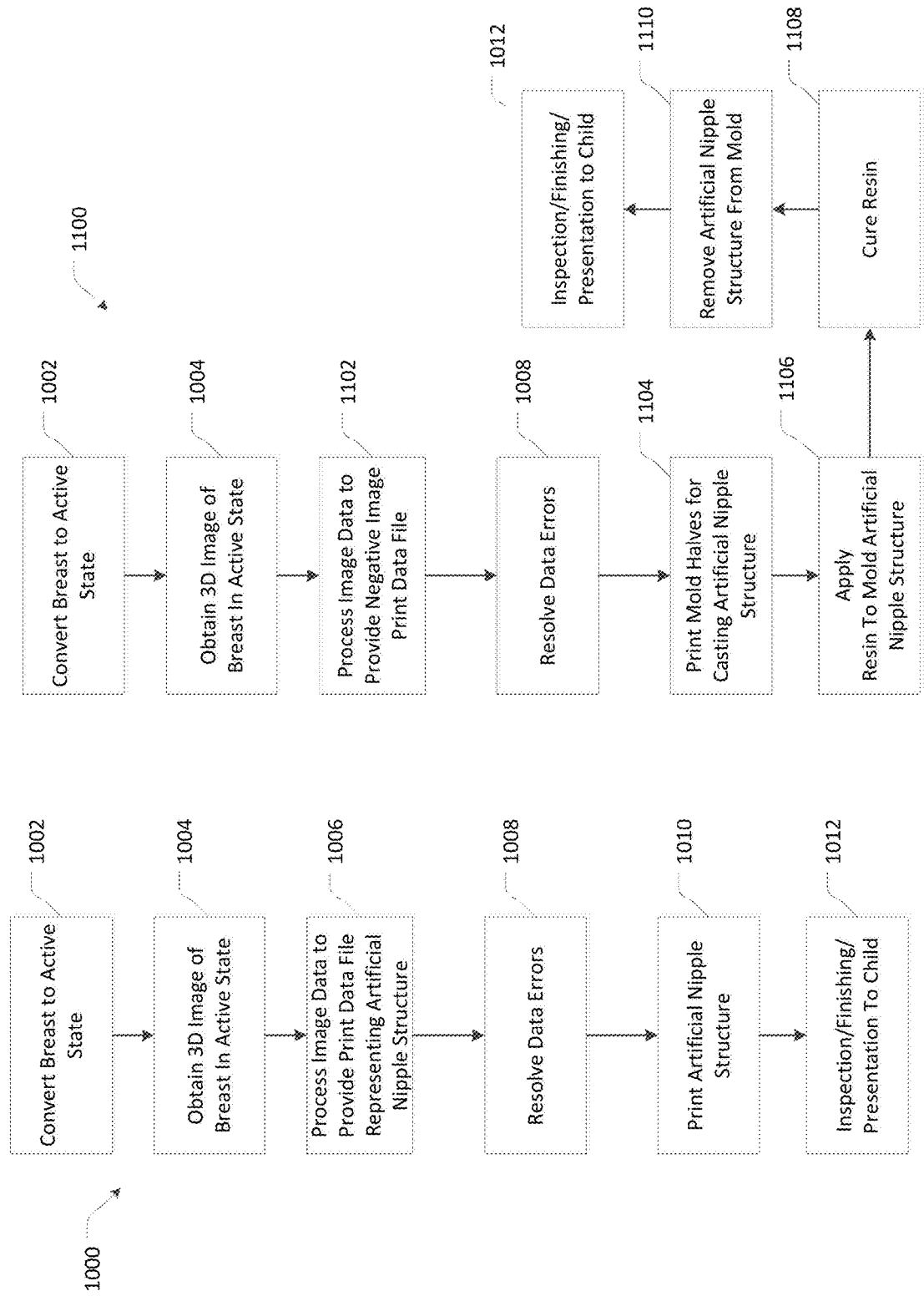

CUSTOM-MADE ARTIFICIAL NIPPLE

RELATED APPLICATIONS

This application is a divisional of co-pending United States patent application Ser. No. 15/482,417, filed on Apr. 7, 2017, now U.S. Pat. No. 10,603,247, which claims the benefit of United States provisional patent application Nos. 62/330,367 and 62/330,634, filed May 2, 2016, each of which are hereby incorporated by reference for all that they disclose.

BACKGROUND

Field of the Invention

The present disclosure pertains to the field of three dimensional printing (3D printing) of anatomy. More particularly, 3D printing is used to replicate a nursing mother's nipple.

Description of the Related Art

Breastfeeding is associated with many advantages for both mother and baby. Some studies suggest an association between breastfeeding and; (1) lower risk of asthma or allergies; (2) fewer ear infections, respiratory illnesses and bouts of diarrhea; (3) higher IQ scores for the baby later in childhood; and (4) improved weight for both mother and baby. Many breastfed infants are also fed using conventional baby bottles. Nipple confusion sometimes arises where a bottle-fed baby "forgets" how to nurse on mother's nipple. This happens because breastfeeding requires far more vigorous mouth and tongue motions and greater muscle coordination than does bottle-feeding. Thus, a newborn who is exposed to conventional bottle nipples or even conventional pacifiers can cease to nurse properly. The art provides no known solution to this problem, other than to let the baby rediscover how to nurse.

3D printing, which is sometimes called additive manufacturing, is a well-known process for producing three dimensional objects. Conventionally, robotic processing utilizes inkjet-like printer heads to deposit successive layers of material into the shape of a three dimensional article. Deposition methods, among others, include such extrusion technologies as fused deposition modeling and, fused filament fabrication of thermoplastics. See, for example, Chee Kai Chua; Kah Fai Leong; Chu Sing Lim (2003). Rapid Prototyping. World Scientific. p. 124. ISBN 978-981-238-117-0. Powder bed deposition technologies include selective heat sintering and selective laser of thermoplastic powder. Powder bed and inkjet head printing may be used to deposit most metal alloys, plaster and powdered polymers. See for example, U.S. Pat. No. 4,247,508 to Housholder for "Molding Process" issued to Hiemenz; and "Rapid prototypes move to metal components, EE Times, Mar. 9, 2007. 3D printing processes may be utilized to make 3D articles utilizing polymers, metals, and ceramics. By way of example, U.S. Pat. No. 7,569,273 issued to Bredt et al., describes the use of powder deposition technology to deposit thermoplastic silicone materials.

3D articles may be printed utilizing a computer-aided design package, a scanner, an ordinary camera, or a 3D specific camera to feed data to photogrammetry software. Commercially available software for this purpose includes, for example, ContextCapture, Pix4Dmapper, Photoscan, 123D Catch, Bundler toolkit, PIXDIM, and Photosketch. 3D Printing has been utilized to make human prosthetic devices. For example, U.S. Pat. No. 5,370,692 to Fink et al. describes the rapid manufacture of bone prosthesis by use of medical computer aided imaging to make a replica of original bone that is deposited using laser-bonded layers of ceramic particles. U.S. Pat. No. 8,454,362 describes the use of a 3D camera to capture data that may be used in making a dental prosthesis, such as a crown.

U.S. Pat. No. 9,044,380 to Sabree et al. describes a process of impression-molding a mother's breast to make a mold from which may be cast either a nipple for a baby bottle or a pacifier. This is problematic in the sense that, practically speaking, the time required for the impression-forming process precludes making a mold of the breast in an active state of lactation, as described below. Moreover, the resins utilized in casting custom nipples from this impression are of questionable safety when used in combination with baby products. Lastly, the impression-forming process physically distorts the nipple area of the breast, which defeats the purpose of forming a custom nipple that closely resembles that of a mother's breast.

Some attempts have been made to make artificial nipples by use of 3D printing, but without good success. WO2017/019401 to Dretzaka-Kaye et al describes a vacuum chamber that retains a breast in position for a laser scanning operation that creates a digital imaging file. The nipple region of the breast may be reproduced as an artificial nipple by use of 3D printing, stereo lithography or molding processes. Here the vacuum problematically distorts the mother's nipple to a non-natural state other than that which would be presented to an infant. Similarly, WO2016/154681 to Mobbs shows imaging of a breast that may be reproduced by use of 3D printing; however, the breast is not placed in an active state of lactation as would normally presented to an infant.

SUMMARY

The presently disclosed instrumentalities advance the art and overcome the problems outlined above by mitigating the problem of nipple confusion. This is done by the use of 3D printing technology to provide an artificial nipple or pacifier that closely resembles the naturally occurring nipple of a child's mother or wet nurse in a state of active lactation. As used herein a "child" may be a human child or a non-human mammalian child.

In one aspect, an elastomeric artificial nipple structure is formed for use as a substitute nipple or pacifier for a nursing child. The artificial nipple structure is custom-made to provide a nipple portion that closely resembles an actual nipple in an active state of lactation that is normally presented to the child when nursing. Generally speaking, the nipple portion described above reproduces the areola and nipple region of a breast and may also transition into an area of the breast posterior of the areola. The actual nipple may be, for example a human nipple. As used herein, the term "closely resembles" means that the reproduced region of areola and/or nipple of a mother's breast is exactly reproduced within a dimensional tolerance that externally deviates less than about 4 or 5% from the original in terms of external length, height and width, or another suitable tolerance that is achievable by 3D printing processes. This variance is preferably less than 3% and more preferably less than 1%. The reproduced region of areola and nipple may be provided with surface texturing features corresponding to those of the actual breast, or else artificial texturing may be provided within the range of dimensional tolerance as an aid to simulate such texture and facilitate suckling.

In another aspect, the artificial nipple may be formed as a component of a baby bottle or a pacifier.

In one aspect, the artificial nipple structure may be cast from a mold to which a synthetic resin may be added to form elastomeric artificial nipples.

A process for making the elastomeric artificial nipple includes converting a breast into an active state of lactation and imaging the breast to obtain 3D image data including a nipple component of the breast. The 3D image data is then processed to provide a print data file, which is submitted to a 3D printer for printing of the artificial nipple structure based upon the print data file to provide an artificial nipple structure with a component that closely resembles a nipple region of the breast.

BRIEF DESCRIPTION OF THE DRAWINGS

FIG. 1 shows a human breast in a resting state;

FIG. 2 shows the breast of FIG. 1 inserted into a breast pump, which converts the breast from the resting state to an active estate of lactation;

FIG. 8 shows an artificial nipple structure in the form of a pacifier according to one embodiment;

FIG. 9 shows a mold that is used for casting of an artificial nipple structure;

FIG. 10 is a process diagram for making the artificial nipple structure according to; one embodiment;

FIG. 11 is a process diagram for making the artificial nipple structure according to; one embodiment;

FIG. 13 shows an active state breast as it is being cast to form an impression;

FIG. 14 shows a casting aid including a nipple portion that is recast in positive form from the impression FIG. 13;

DETAILED DESCRIPTION

Figure 3:
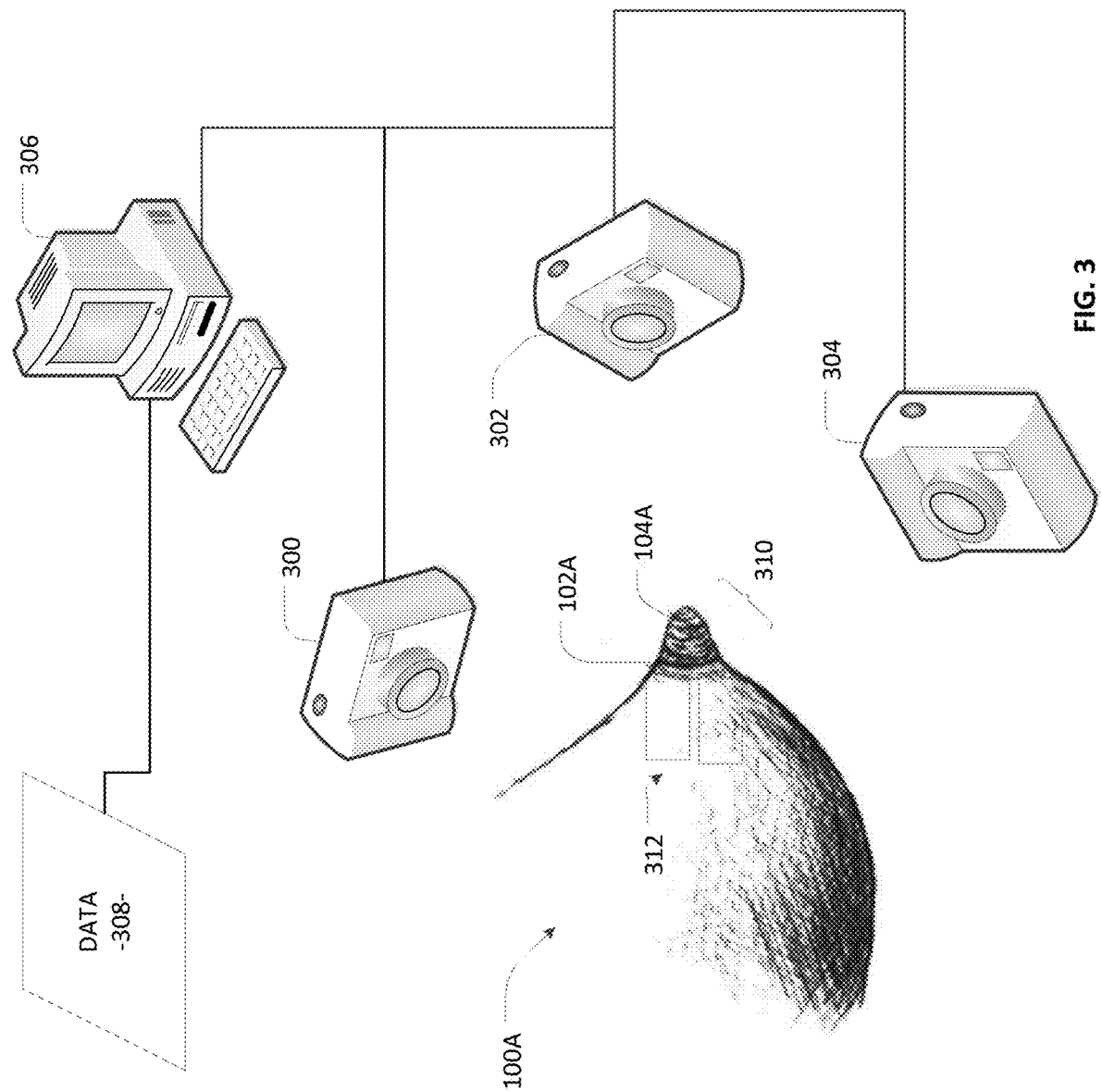
FIG. 3 show the breast as it is being imaged in the active state with consequent processing of the image data to provide print data that is suitable for purposes of 3D printing.

The female breast is ordinarily divided into 15-25 lobes that are separated by connective and adipose tissue. These lobes radiate out from the nipple and are subdivided into lobules. Each lobe drains into a lactiferous duct and each duct has a dilation called a lactiferous sinus behind the nipple for milk storage. As is well known, the ducts branch and grow when activated by estrogen and progesterone stimulation during pregnancy. These stimulated glandular units form alveoli which are secretory units lined by simple cuboidal epithelium, surrounded by a basement membrane and wrapped in myoepithelial cells which surround the entire alveolus. The developing alveoli replace much of the adipose tissue.

FIG. 1 shows one-such human breast in a resting state 100. The breast in state 100 is capable of producing milk for expression to an infant almost immediately upon demand, but in the resting state 100 has not has not yet let down the milk for immediate delivery to a child. The breast 100 has areola 102 from which nipple 104 protrudes in a substantially cylindrical shape. No milk is produced during the non-pregnant and non-lactating state. The internal breast (not shown) consists of mostly adipose tissue with small amounts of glandular tissue and ducts.

FIG. 2 shows the breast positioned within an intake 200 of a breast-pump 202 The breast pump 202 provides a physical stimulus converting breast 100 from the resting state shown in FIG. 1 to an active state 100A in which the breast is ready to express milk. Other means may perform this state conversion equally as well, such as by actual nursing activity or manual stimulation. The breast pump 202 may be any type of commercially available breast pump that is commonly used by nursing mothers to harvest breast milk for later consumption by a nursing child, such as an infant.

FIG. 3 shows the breast in a naturally occurring active state 100A, which is associated with the well-known morphological changes indicated as areola 102A and nipple 104A. These changes are ascertainable by way of comparison between FIG. 1 and FIG. 3 where FIG. 1 shows the breast in a resting state 100 and FIG. 3 shows the same breast in a naturally occurring state 100A of active lactation. As shown in this comparison, the areola 102A and nipple 104A form a relatively conical structure, compared to areola 102 and nipple 104. This change is due to the accumulation of milk in interior ducts (not shown) proximate areola 102A as is well known in the art. When lactation ceases or sucking ceases from the breast in the active state 100A, these changes may revert to the resting state 100 within about 2 minutes. Breasts come in all shapes and sizes, as do areolae and nipples, so the change comparison described herein is provided by way of example to illustrate that morphological changes do occur between resting and active states, but it is understood in the art that the usual changes described here are not universally applicable to all breasts.

As shown in FIG. 3, a conventional 3D camera 300 may be used to photograph breast 100A in the naturally occurring active state. Additional cameras may be provided for stereoscopic vision, especially in the area 310 proximate areola 102A and nipple 104A. The cameras 300, 302, 304 provide image data to an imaging computer 306, which utilizes commercially available software to create an imaging file, here represented as data 308, of a type commonly utilized to operate a 3D printer in making an article. The imaging focuses especially on the area 310 proximate areola 102A and nipple 104A to provide sufficient structure for an infant to nurse. A fiducial 312 may be drawn onto breast 100 or placed as an adhesive sticker in the area 310 to provide a more precise indicator of scale that may be processed to render a true-to-scale representation of region 310 in the data 308 processed by computer 306. This processing preferably reproduces the structure of region 310 atop a standardized base section that is suitable for use as a nipple for a baby bottle or pacifier, as explained in more detail below.

For embodiments utilizing only one camera, a preferred aspect is to use a 3D scanning technology, such as Microsoft's MobileFusion™ application, which turns an iPhone® into a 3D scanner. This is a class of device that obtains a plurality of pictures from a single imager and is able to use depth of scale in rendering a 3D image that is readily convertible into print image data 308 for use in 3D printing applications.

Figure 4:
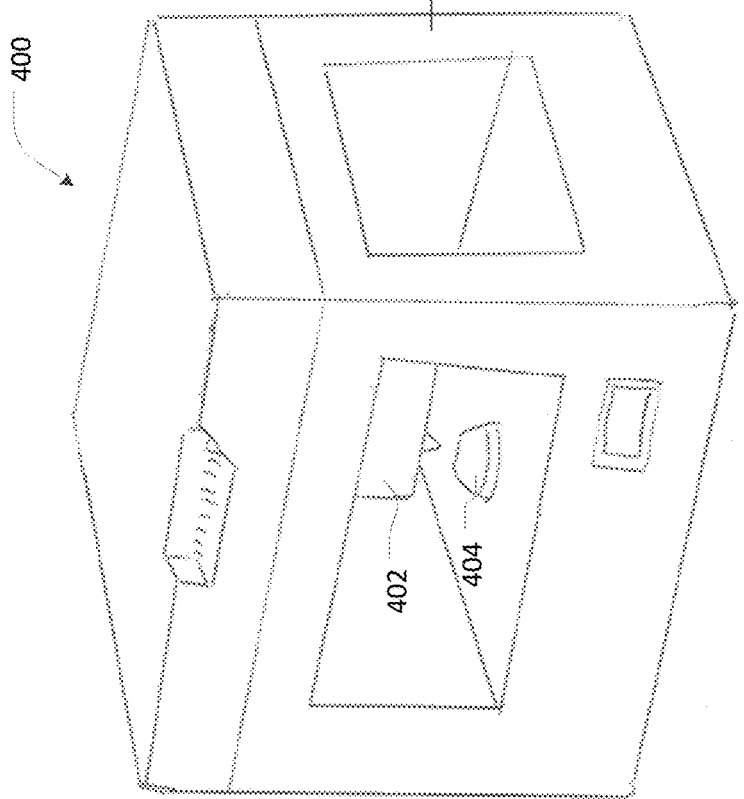
FIG. 4 shows a 3D printer in a state of printing an artificial nipple structure based upon the print data.

As shown in FIG. 4, the computer 306 data 308 to a commercially available 3D printer 400 where a print head 402 forms an artificial nipple structure 404. The printer 400 is selected from among commercially available options for its ability to print a 3D image as described above. The material that is printed depends upon the desired manner of constructing a 3D nipple structure that closely resembles that of region 310 which is imaged according to the discussion of FIG. 3. The artificial nipple structure may be suitable for use as a nipple for a baby bottle or pacifier. It will be appreciated that the use of 3D printing may be associated with structural artifacts, such as the formation of fine lines in the reproduced structure that are present in the artificial nipple structure that are not found in the actual nipple 100A. Nonetheless, generally speaking, the technology of 3D printing has sufficiently advanced that such lines are suitably small that they do not preclude making an artificial, nipple structure which closely resembles the actual nipple 100A.

Figure 5:
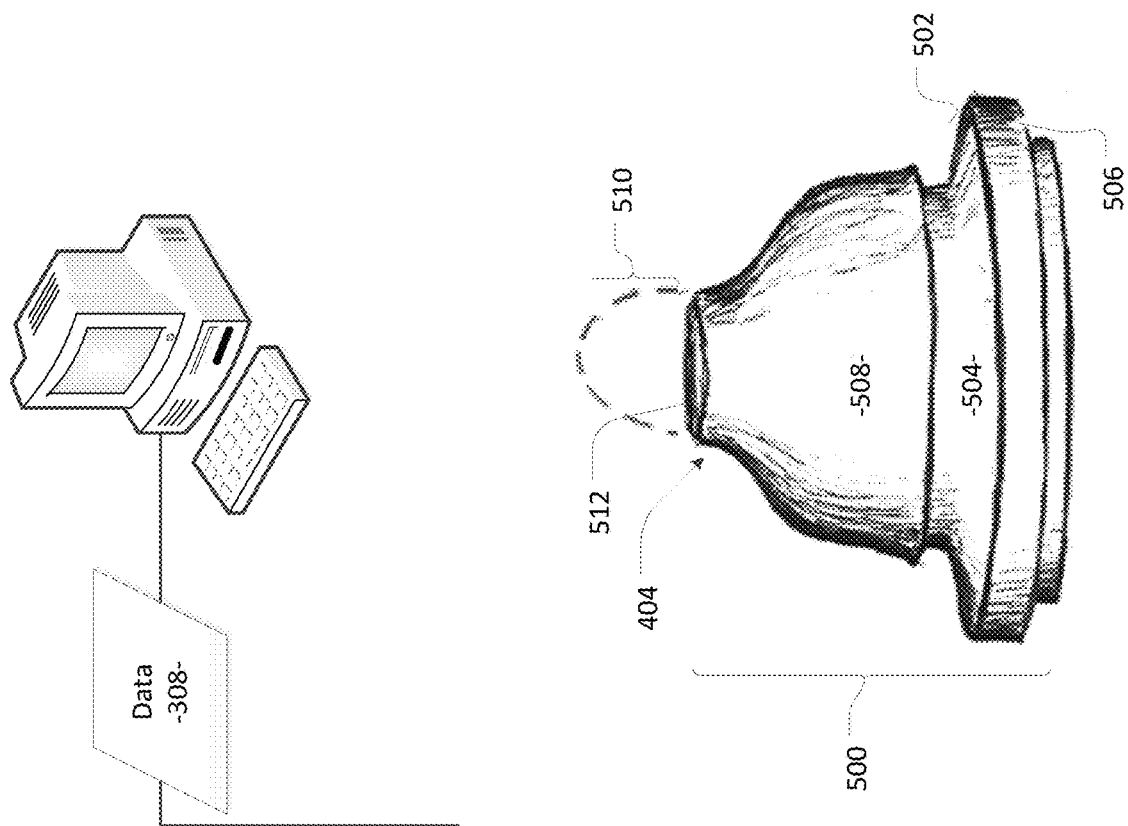
FIG. 5 provides additional detail with respect to forming the artificial nipple structure according to one embodiment.
Figure 6:
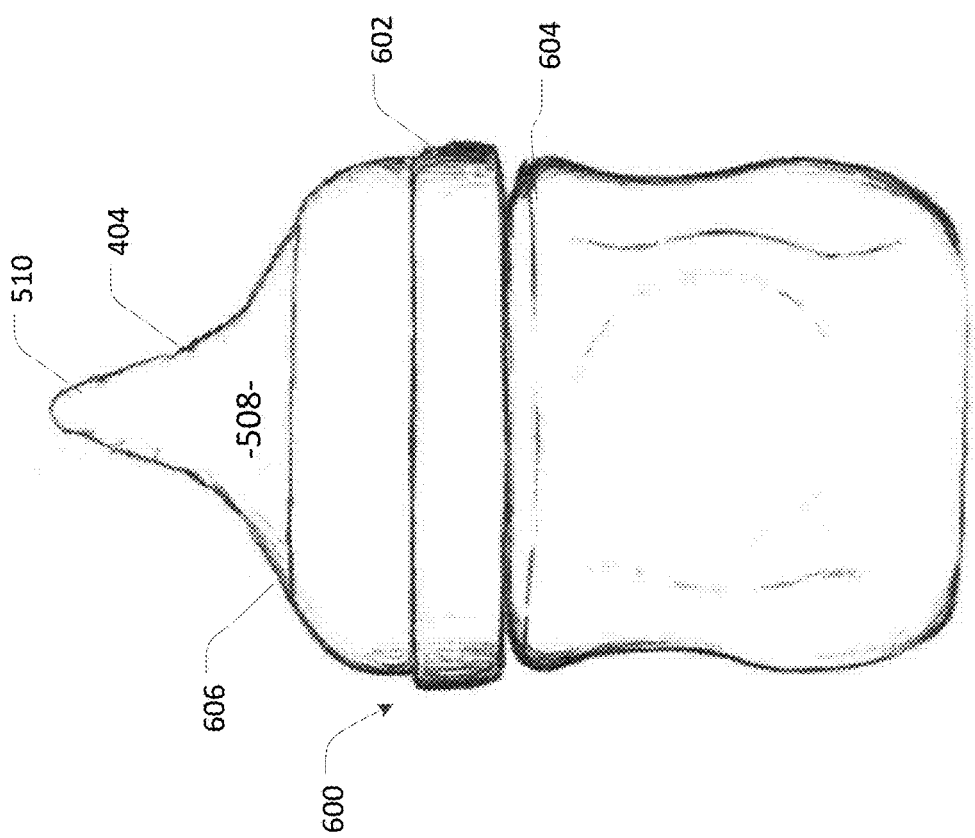
FIG. 6 shows an artificial nipple structure in the form of a nipple for a baby bottle.

By way of example, FIG. 5 shows the artificial nipple structure 404 as it is being formed in successive layers by the print head 402. Here the artificial nipple structure 404 is a nipple for use in a baby bottle as is also shown in FIG. 6. The artificial nipple structure 404 includes a base section 500 that is dimensionally compatible with a conventional baby bottle 600 (see also FIG. 6). The conventional portion of the design includes, for example, a screw-on cap 602 (see FIG. 6) that compresses an elastomeric flange 502 against a milk reservoir body 604 to form a seal at edges 504, 506. A bulge 508 passes through orifice 606 of the screw-on cap 602 to present an artificial nipple structure 404 including portion 510 that closely resembles or reproduces, from an exterior perspective, the features of active breast region 310 as shown in FIG. 3. As shown in FIG. 5, portion 510 has not yet been completely printed, but the object of this printing exercise is to custom-form the artificial nipple structure of portion 510 in a manner reproduces as closely as possible the nipple structure in region 310 of a mother or wet-nurse. Thus, the artificial nipple structure 404, as provided with as internal flow passageway 512, may be used to dispense milk or formula to an infant. The internal dimensions of artificial nipple structure 404 may be reduced by a form factor, such as by 75% to 95% of the external dimensions to provide an overall wall thickness that is suitably strong for purposes of nursing a child without substantial risk of creating a choking hazard. It will be appreciated that the base section 500 may be 3D printed in its entire form atop a digitally created base section 500 or, alternatively, provided as a preexisting blank in the form shown generally in base section 500 to which area 510 is successively added by use of the printer head 402.

The artificial nipple structure 404 is alternatively a pacifier 700 closely resembling the actual nipple structure of a mother or wet-nurse. This is shown, for example, in FIG. 7 where a pacifier 700 has been 3D printed to reproduce the active state nipple structure 310 (see FIG. 3) of a mother or wet nurse. The resulting nipple 702 closely reproduces the active state nipple structure 310 of a mother or wet nurse, and this has been by imaging an active state breast 100A according to the process described above. The pacifier 700 may be printed as a one-piece article of manufacture on a base section 704 including a plate 706 with indentations 708, 710 to accommodate a baby's nose when the baby is sucking on nipple 702, together with a cylindrical base 712 connected to grip ring 714. The nipple 702 may be solid or it may optionally have a hollow interior 716, the position of which is indicated by dashed interior lines 718, 720, to promote flexion as a baby sucks on nipple 702.

The grip ring 714 may be integrally formed with the cylindrical base 712 in a single printing operation. Alternatively, the grip ring 712 may be formed with barbs, such as barb 722 at opposed ends, the barbs being insertable through an orifice 724 in the cylindrical base 712 communicating with the hollow interior 716 such that the barb 722 expands in the interior 716 to preclude removal of the barb from the orifice.

Figure 7:
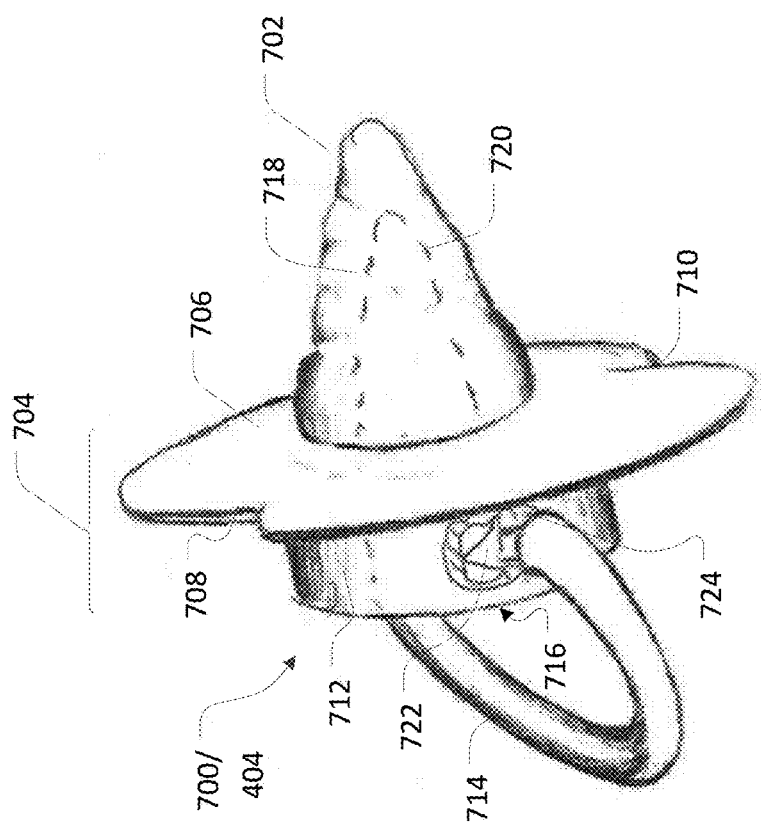
FIG. 7 shows an artificial nipple structure in the form of a pacifier according to one embodiment.

FIG. 8 shows the artificial nipple structure as another type of pacifier 800 in which the same type of nipple 702 as is shown in FIG. 7 is 3D printed atop a different base 802. The base 802 has a cylindrical section 804 that is integrally bonded to the nipple 702. The cylindrical section 804 has an opening 806 leading to a hollow interior space, the position of which is indicated by dashed lines 718, 720. This opening 806 is sufficiently large to accommodate a finger such that the nipple 702 may be positioned on a finger and placed in an infant's mouth to stimulate sucking activity. A grip tab 808 is provided to facilitate positioning and/or removal of the pacifier 600 from the infant's mouth.

FIG. 9 shows a mold 900 including a first part 902 and a second part 904. The first part 902 and the second part 904 are separably adjoined along junction 906. The first part 902 has a recess defined by internal margins 908 formed therein. The margins 908 may be determined by imaging of an active state breast 100 as represented above in FIG. 3 and the discussion thereof; however, the margins 908 reproduce that image as a negative or subtractive structure formed in the matrix of the first part 902. Thus, the first part 902 may be 3D printed to reproduce the breast 100 as a negative image or hole defined by margins 908.

An internal structure 910 is formed integral to the second part 904, fitting within the recess formed by margins 908. The internal structure 910 has complementary dimensions with respect to the margins 908, such that a space 912 is provided therebetween. As shown in FIG. 9, the space provides an artificial nipple structure 404 according to the embodiment of FIG. 5. In one aspect, the space 912 may be provided by 3D imaging as described above to impart complementary dimensions to the nipple structure 910 making the internal structure 910 is smaller than the margins 908 by a form factor, such as a reduction to 75% to 95% of the outer dimensions defined by margins 908. The space 912 may be thickened as needed, especially in areas where sucking action occurs to mitigate the risk where breakage of the end product may cause a choking hazard. A connector 914 provides a pathway communicating a source of injection molding polymer 916 with the space 912. Thus, a polymer 916 in liquid form may be introduced into the space 912 where it is allowed to harden as it cures.

The liquid polymer 916 is formulated to cure, for example, into a PVC plastic, latex or silicone based material, and is preferably silicone or a copolymer of silicone in a variety that has regulatory approval for use in the nipples of baby bottles or pacifiers as the case may be. The material may be, for example, a medical grade silicone. The material is preferably free of bisphenol-A (BPA) and nitrosamines.

As shown in FIG. 9, the numeral space 912 is constructed and arranged to provide the artificial nipple structure as a nipple for use in a baby bottle, corresponding to FIG. 5. It will be appreciated that the space 912 may also be constructed and arranged to provide the artificial nipple structure 404 in the form of pacifiers 700, 800 as shown in FIGS. 7 and 8.

FIG. 10 shows a process 1000 of making the artificial nipple structure 500. To begin, a resting state breast is converted 1002 to active state, as described supra in context of FIGS. 1-3. The active state breast is imaged 1004 in a 3D context, as described in FIG. 3. The image data is processed 1006 to provide data, such as a STL file, that is compatible with software for use in 3D Printing. Step 1008 is optionally performed as needed to resolve imaging errors, as provided for in some commercially available software packages. This may require operator intervention to resolve apparent data errors that are visually apparent on a model image after the processing of step 1006. An artificial nipple structure, such as is shown as the artificial nipple structure 404 in any one of FIG. 5, 7 or 8, is then printed 1010 as described in context of FIG. 4. The artificial nipple structure is optionally but preferably inspected and finished 1012 in a manual operation, after which the artificial nipple structure may be presented to a child in the intended environment of use. The steps 1010-1012 may be successively repeated to provide a plurality of elastomeric nipple structures cast from a single mold or 3D image.

FIG. 11 shows process 1100, which is a variant of process 1000 intended for molding of an artificial nipple structure 404. In FIG. 11, identical numbering is preserved for steps that are the same as the correspondingly numbered steps shown in FIG. 10. Step 1102 entails making a negative image data file such that the data may be utilized s a subtractive image to print 1104 the first part 902 and the second part 904 of mold 900, as shown in FIG. 9. With the mold complete, a suitable resin is applied 1106 to the mold, such as by injection molding or pouring resin into the mold, to form the artificial nipple structure. The resin is allowed to cure 1108 before the artificial nipple structure is removed 1110 from the mold. The steps 1106-1012 may be successively repeated to provide a plurality of elastomeric nipple structures cast from a single mold.

Figure 12:
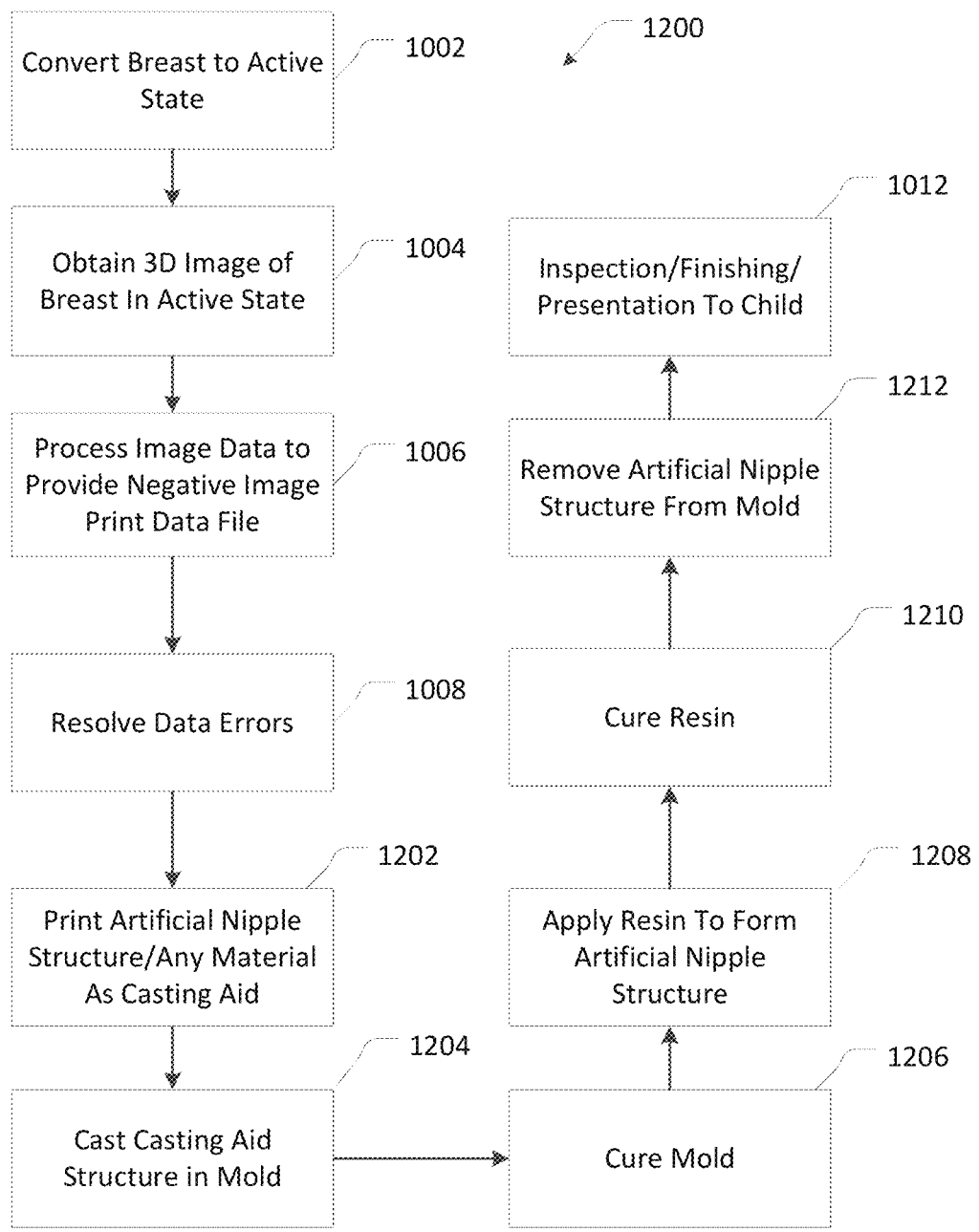
FIG. 12 is a process diagram for making the artificial nipple structure according to; one embodiment.

FIG. 12 shows process 1200, which is a variant of process 1000 intended for molding of an artificial nipple structure 404. In FIG. 12, identical numbering is preserved for steps that are the same as steps shown in Fig, 10. Step 1202 printing an artificial nipple structure as a casting aid; however, this process step differs from that of step 1010 because any material may be used in the printing operation. Hard plastic is preferred. The casting aid is then cast to make a mold 900 including the first part 902 and the second part 904 of mold 900, as shown in FIG. 9. The mold 900 may be made of any curable polymeric resin, which is cured 1206 to complete the mold 900. With the mold complete, another resin is applied 1208 to the mold, such as by injection molding or pouring resin into the mold, to form the artificial nipple structure. The resin is allowed to cure 1210 before the artificial nipple structure is removed 1212 from the mold. The steps 1208-1012 may be successively repeated to provide a plurality of elastomeric nipple structures cast from a single mold.

FIG. 13 shows an alternative way of making an artificial nipple structure that does not involve the use of 3D printing. Imaging of the active state breast 100A is not required when the active state breast 100A is placed in a molding device 1300. The molding device 1300 may be shaped generally like a funnel with a bowl 1302 for receipt of the active state breast 100A. The bowl 1302 orients the nipple region 1304 of the active state breast 100A generally central to cylinder 1306. One or more through orifices 1308 communicate thorough the cylinder 1306 for receipt of a fast curing resin 1310. One example of a suitable quick setting resin is a dental impression resin, such as the siloxane and silicone based material as represented by Alginot FS™ sold by Kerr Corporation of Orange, Calif. The resin within cylinder 1306 cures to leave an impression of the nipple region 1304 in plug 1312. A plunger 1314 may be reciprocated 1316 within the cylinder 1306 to dislodge the plug 1312 and subsequently repositioned for a new molding process. The internal surfaces of cylinder 1306 may be coated with a release agent to facilitate removal of the plug 1312.

Figure 15:
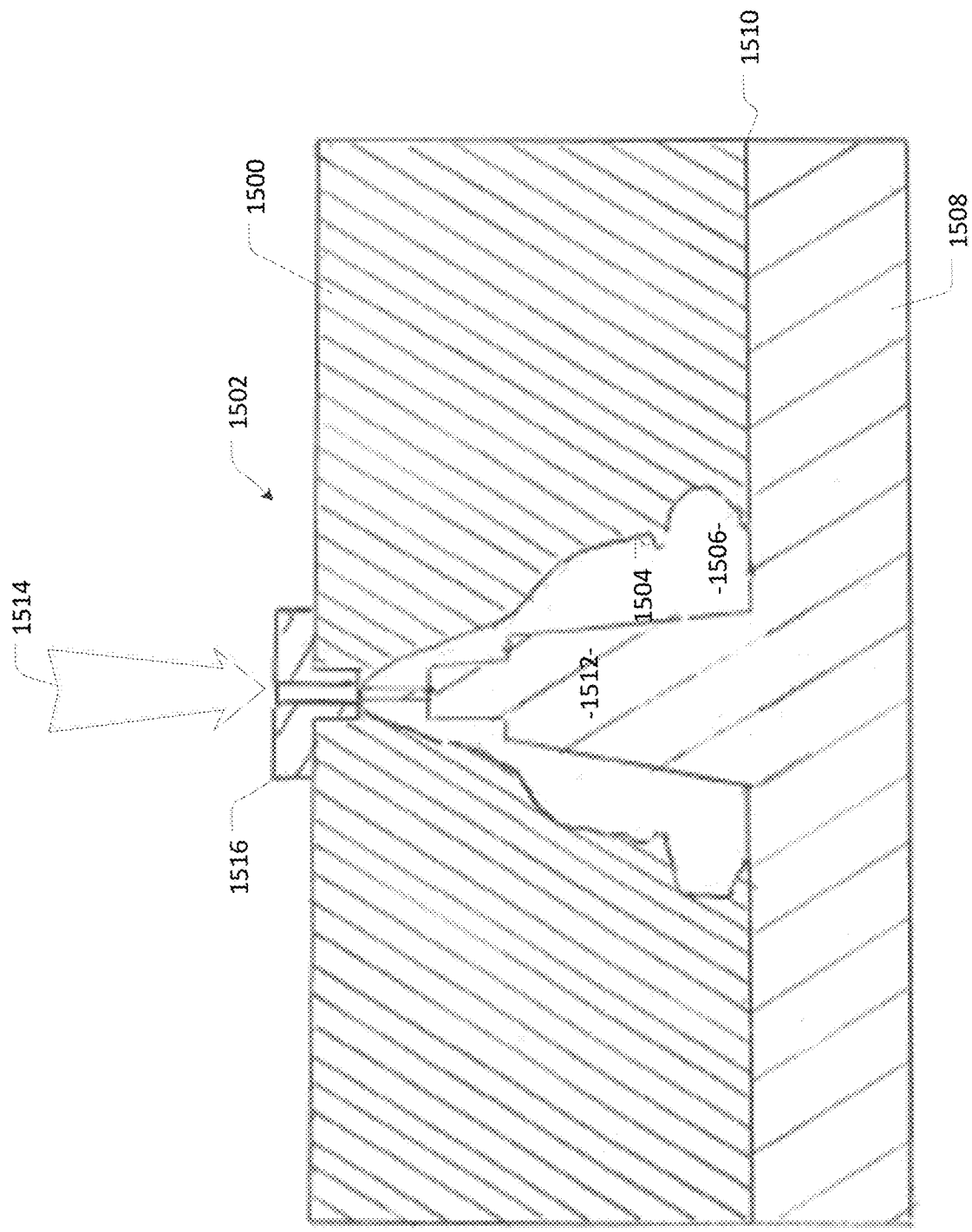
FIG. 15 shows a mold that is made utilizing the casting aid of FIG. 14.

As shown in FIG. 14, the portion of the plug 1312 in which is formed the impression of nipple portion 1304 may be cast from the cured resin as a positive reproduction 1304A, trimmed and manually fitted atop a base section, such as the base section 500 of FIG. 5, to form casting aid 1400 Alternative base sections include the base sections 704 and 802 for use as pacifiers as shown in FIGS. 7 and 8. The casting aid 1400 is then used in a casting process to make a top portion 1500 of mold 1502, as shown in FIG. 15. The top portion 1500 includes indentation 1504, which defines space 1506. A second portion 1508 of mold 1502 separably adjoins the first portion 1500 at junction 1510 and includes a stepped protrusion 1512. Introduction of resin 1514 through connector orifice 1516 fills space 1506 with resin that mat be allowed to cure in forming any one of the artificial nipple structures 404 described above. However, these artificial nipple structures will not have the process artifacts associated with 3D printing.

Figure 16:
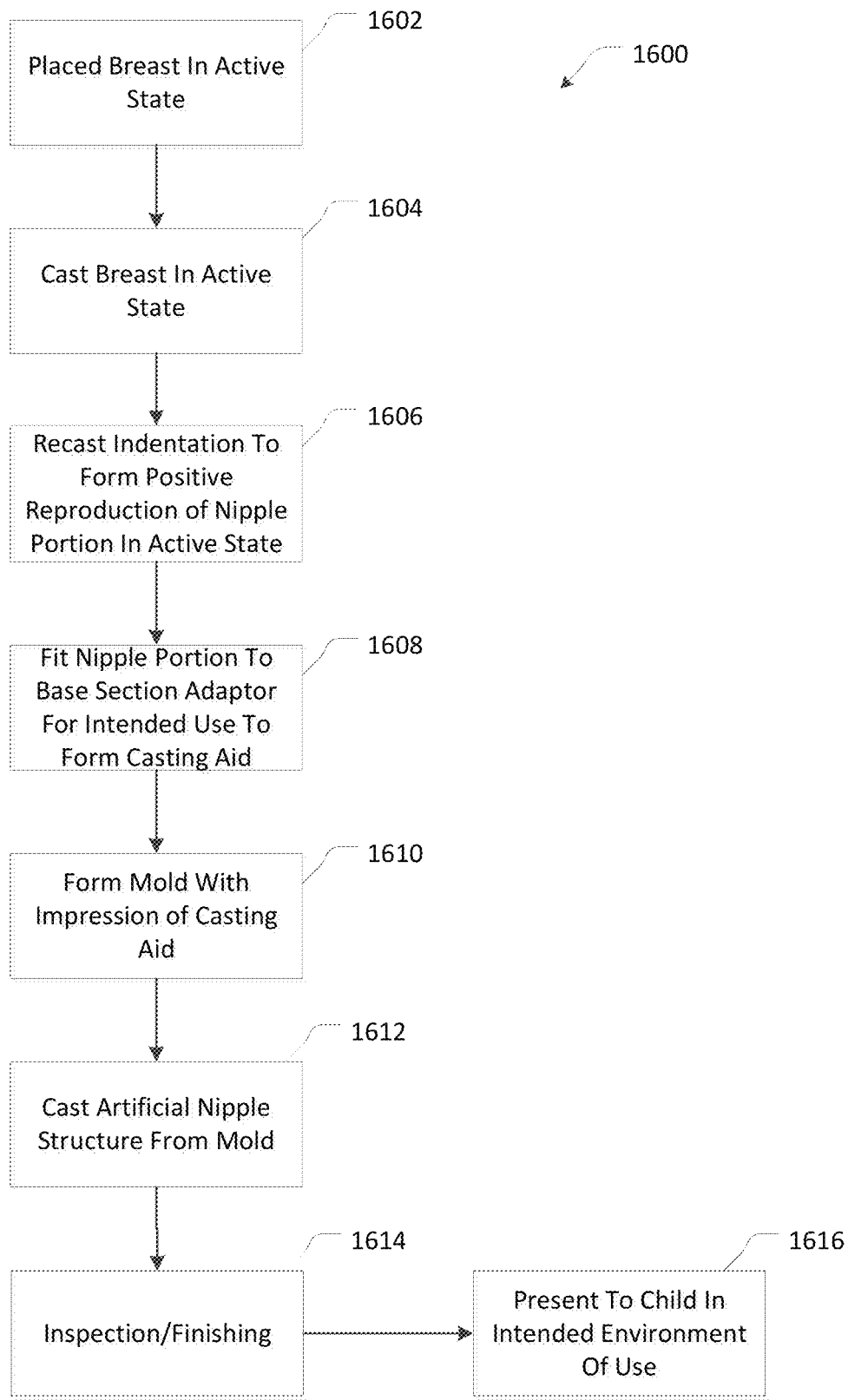
FIG. 16 is a process diagram showing the steps of making a mold, such as the mold shown in FIG. 15.

FIG. 16 shows a process 1600 of making an artificial nipple structure as illustrated in FIGS. 13-15. A breast is placed 1602 in an active state of lactation, then cast 1604 using quick-setting resin to form an indentation that reproduces at least the nipple region of the breast in the active state. The indentation is recast 1606 to form a positive reproduction of the nipple region. The nipple portion resulting from step 1606 is fitted 1608 to a base section that is essentially an adaptor for presenting the nipple portion in the intended environment of use. This base section may be, for example, any one of base sections 500, 704 or 802 described above. The fitting operation may be performed manually, as by adhering the nipple portion to the base to form a casting aid. Alternatively, the fitting operation may be done digitally to meld data connecting the nipple portion to the base, with subsequent 3D printing of the casting aid. In either case, a casting aid results from the competed fitting operation. The casting aid is then used to form 1610 a mold component that embodies an impression of the casting aid. This casting step 1610 may be successively repeated to provide a plurality of elastomeric nipple structures cast from a single mold. The resulting mold is utilized to cast 1612 an artificial nipple structure. After optional inspection and finishing 1614 the artificial nipple structure is presented 1616 to a child. The steps 1612-1614 may be successively repeated to provide a plurality of elastomeric nipple structures cast from a single mold.

Although a human nipple is depicted in the drawings, it will be appreciated that the instrumentalities described herein are not limited to human nipples and may be extended to other mammalian nipples, such as those of other primates, livestock, or mammals constituting endangered species.

Those of ordinary skill in the art will understand that the foregoing discussion teaches by way of example and not be limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. In an elastomeric artificial nipple structure utilized as a substitute nipple for presentation to a child, the improvement comprising:

the artificial nipple structure being custom-made to provide a portion reproducing an actual nipple in an active state of active lactation that is normally presented to the child in a natural state when nursing, the artificial nipple structure being produced by a process of placing a nipple region of a breast using physical stimulus into an active state of lactation made ready for the expression of milk to a child when nursing, the active state of lactation being characterized by morphological changes to the actual nipple that naturally occur due to the accumulation of milk in interior ducts proximate an areola associated with the actual nipple;

imaging the nipple region of the breast in the active state devoid of the physical stimulus to obtain 3D image data representing the nipple region;

processing the 3D image data to provide a print data file; and accessing the print data file to print the artificial nipple structure utilizing an elastomer based upon the print data file to provide the artificial nipple structure with the portion thereof reproducing the nipple region.

2. The artificial nipple structure of claim 1, wherein the actual nipple is a human nipple.

3. The artificial nipple structure of claim 1 formed as a nipple for a baby bottle.

4. The artificial nipple structure of claim 1 formed as a nipple for a pacifier.

5. The artificial nipple structure of claim 1 wherein the elastomer includes silicone.

6. The artificial nipple structure of claim 1 wherein the elastomer includes latex.

7. The artificial nipple structure of claim 1 wherein the portion defines an interior hollow space.

8. An artificial nipple comprising a nipple portion formed from an elastomeric material, the nipple portion produced from 3D image data obtained by imaging a nipple region of a breast in an active state of lactation, the active state of lactation being characterized by morphological changes to the nipple region of the breast that naturally occur due to the accumulation of milk in interior ducts proximate an areola associated with the nipple region, the active state of lactation being produced by physical stimulation of the nipple region, the imaging being conducted in the absence of the physical stimulation of the nipple region and before the nipple region reverts to a resting state, the artificial nipple substantially duplicating the morphological changes to the nipple region of the breast in the active state of lactation.

9. The artificial nipple of claim 8, wherein said nipple portion reproduces substantially the entirety of the areola and the nipple region of the breast in the active state of lactation.

10. The artificial nipple of claim 8, wherein the nipple region of the breast is placed in the active state of lactation by manual stimulation and wherein the imaging is conducted in the absence of the manual stimulation.

11. The artificial nipple of claim 8 formed as a nipple for a baby bottle.

12. The artificial nipple of claim 8 formed as a nipple for a pacifier.

13. The artificial nipple of claim 8 wherein the elastomeric material comprises silicone.

14. The artificial nipple of claim 8 wherein the elastomeric material comprises latex.

* * * * *